US010338794B2

(12) United States Patent
Persson et al.

(10) Patent No.: US 10,338,794 B2
(45) Date of Patent: Jul. 2, 2019

(54) PLAYBACK OF MEDIA STREAMS IN DEPENDENCE OF A TIME OF A DAY

(71) Applicant: SPOTIFY AB, Stockholm (SE)

(72) Inventors: Karl-Johan Persson, Stockholm (SE);
Steven Paul Everington, Stockholm (SE); Fredric Vinnå, Stockholm (SE);
Stig Gustav Viktor Söderström, Ekero (SE); Daniel Galfvensjö, Hagersten (SE); Ari Liusaari, London (GB);
Dejan Sormaz, New York, NY (US);
Felice Mancino, San Francisco, CA (US); Samwoo E, Eaglewood, NJ (US)

(73) Assignee: SPOTIFY AB, Stockholm (SE)

(*) Notice: Subject to any disclaimer, the term of this patent is extended or adjusted under 35 U.S.C. 154(b) by 461 days.

(21) Appl. No.: 14/714,157

(22) Filed: May 15, 2015

(65) Prior Publication Data

US 2016/0334978 A1    Nov. 17, 2016

(51) Int. Cl.
*G06F 3/0484* (2013.01)
*G06F 3/0488* (2013.01)
(Continued)

(52) U.S. Cl.
CPC ........ *G06F 3/04847* (2013.01); *G06F 3/0482* (2013.01); *G06F 3/04883* (2013.01);
(Continued)

(58) Field of Classification Search
CPC .. G06F 3/04847; G06F 3/04883; G06F 3/165; G09G 2320/0613;
(Continued)

(56) References Cited

U.S. PATENT DOCUMENTS 6,064,379 A    5/2000  DeMoney
6,230,323 B1*  5/2001  Hama .................... H04N 5/44
                                            348/E5.096

(Continued)

OTHER PUBLICATIONS

Office Action issued by United States Patent and Trademark Office for U.S. Appl. No. 14/839,491, dated Aug. 25, 2016 (19 pages).
(Continued)

*Primary Examiner* — Shourjo Dasgupta
(74) *Attorney, Agent, or Firm* — Tucker Ellis LLP

(57) ABSTRACT

This disclosure concerns the providing of media, and more particularly to the streaming of media. In accordance with an example embodiment: a portion of a day is determined; a first data message is sent to a computer server system. The first data message comprises instructions to the computer server system to return media content associated with the determined portion of the day. A second data message is received from the computer server system, the second data message comprising media content associated with the determined portion of the day. In response thereto is playback performed of the media content at the user interface of the electronic device in dependence of the determined portion of the day. While performing playback is a visual appearance parameter of the user interface adjusted according the determined portion of the day.

37 Claims, 11 Drawing Sheets

(51) Int. Cl.
*G06F 3/16* (2006.01)
*H04L 29/08* (2006.01)
*H04L 12/58* (2006.01)
*G06F 3/0482* (2013.01)
*G09G 5/30* (2006.01)
*G09G 5/10* (2006.01)
*H04L 29/06* (2006.01)

(52) U.S. Cl.
CPC .............. *G06F 3/165* (2013.01); *G09G 5/10* (2013.01); *G09G 5/30* (2013.01); *H04L 51/10* (2013.01); *H04L 65/4084* (2013.01); *H04L 67/141* (2013.01); *G09G 2320/0613* (2013.01); *G09G 2320/0626* (2013.01); *G09G 2320/08* (2013.01); *G09G 2320/10* (2013.01); *G09G 2354/00* (2013.01)

(58) Field of Classification Search
CPC ....... G09G 2320/0626; G09G 2320/08; G09G 2354/00; H04L 67/141
USPC ................................ 715/716, 810, 844, 866
See application file for complete search history.

(56) References Cited

U.S. PATENT DOCUMENTS

| | | | |
|---|---|---|---|
| 6,904,610 | B1 | 6/2005 | Bayrakeri et al. |
| 8,108,342 | B2 | 1/2012 | Salinas et al. |
| 8,228,435 | B2 | 7/2012 | Yi |
| 8,321,041 | B2 | 11/2012 | Jellison, Jr. et al. |
| 8,521,316 | B2 | 8/2013 | Louboutin |
| 8,713,193 | B1 | 4/2014 | Breau |
| 8,892,233 | B1 | 11/2014 | Lin et al. |
| 2001/0008577 | A1 | 7/2001 | Yamada et al. |
| 2001/0056577 | A1 | 12/2001 | Gordon et al. |
| 2003/0233615 | A1 | 12/2003 | Morimoto et al. |
| 2004/0203639 | A1* | 10/2004 | Ozer .................. H04N 5/44543 455/414.1 |
| 2006/0013564 | A1 | 1/2006 | Hamada et al. |
| 2006/0037008 | A1 | 2/2006 | Steltzer et al. |
| 2007/0118850 | A1 | 5/2007 | Bertin |
| 2007/0232225 | A1 | 10/2007 | Kikuchi |
| 2007/0233743 | A1 | 10/2007 | Rosenberg |
| 2008/0052150 | A1 | 2/2008 | Grouf et al. |
| 2009/0037596 | A1 | 2/2009 | Math et al. |
| 2009/0049097 | A1 | 2/2009 | Nocifera et al. |
| 2009/0063159 | A1 | 3/2009 | Crockett |
| 2009/0249206 | A1 | 10/2009 | Stahlberg |
| 2010/0077350 | A1 | 3/2010 | Lim et al. |
| 2010/0157157 | A1 | 6/2010 | Yi |
| 2010/0239078 | A1 | 9/2010 | Sweeney et al. |
| 2011/0077047 | A1 | 3/2011 | Epp et al. |
| 2011/0231762 | A1 | 9/2011 | Toida |
| 2012/0105724 | A1 | 5/2012 | Candelore |
| 2012/0158769 | A1 | 6/2012 | Gratton |
| 2012/0174037 | A1 | 7/2012 | Relyea et al. |
| 2012/0185070 | A1 | 7/2012 | Hagg et al. |
| 2012/0311443 | A1 | 12/2012 | Chaudri et al. |
| 2013/0097558 | A1 | 4/2013 | Lichtenstein |
| 2013/0173526 | A1 | 7/2013 | Wong et al. |
| 2013/0179920 | A1 | 7/2013 | Esaka |
| 2013/0218961 | A1 | 8/2013 | Ho |
| 2013/0316763 | A1 | 11/2013 | Kader |
| 2014/0052823 | A1 | 2/2014 | Gavade et al. |
| 2014/0075314 | A1 | 3/2014 | Bachman et al. |
| 2014/0108929 | A1 | 4/2014 | Garmark et al. |
| 2014/0180818 | A1 | 6/2014 | Mistler et al. |
| 2014/0355789 | A1 | 12/2014 | Bohrarper et al. |
| 2015/0018992 | A1 | 1/2015 | Griffiths et al. |
| 2015/0039634 | A1 | 2/2015 | Mo et al. |
| 2015/0082172 | A1 | 3/2015 | Shakib et al. |
| 2015/0358661 | A1 | 12/2015 | Navarro et al. |
| 2016/0042075 | A1 | 2/2016 | Brett et al. |
| 2016/0050130 | A1 | 2/2016 | Ljung et al. |
| 2016/0154537 | A1 | 6/2016 | Lee et al. |
| 2016/0195856 | A1 | 7/2016 | Spero |
| 2016/0334979 | A1 | 11/2016 | Persson et al. |

OTHER PUBLICATIONS

Office Action issued by United States Patent and Trademark Office for U.S. Appl. No. 14/839,512, dated Apr. 28, 2016, 17 pages.
Office Action issued by United States Patent and Trademark Office for U.S. Appl. No. 14/839,512, dated Nov. 27, 2015, 12 pages.
"How to Change Date and Time on the iPhone", published to http:www.wikihow.com.Change-Date-and-Time-on-the-iPhone on Mar. 2, 2015, 5 pages.
Office Action issued by United States Patent and Trademark Office for U.S. Appl. No. 14/839,491, dated Feb. 16, 2016, 18 pages.
Office Action issued by United States Patent and Trademark Office for U.S. Appl. No. 14/714,161, dated Dec. 21, 2016, 11 pages.
Office Action issued by United States Patent and Trademark Office for U.S. Appl. No. 14/839,491, dated Dec. 30, 2016, 7 pages.
Office Action issued by United States Patent and Trademark Office for U.S. Appl. No. 14/839,512, dated Mar. 14, 2017, 15 pages.
Office Action issued by United States Patent and Trademark Office for U.S. Appl. No. 14/714,161, dated Jun. 12, 2017, 16 pages.
ID3 draft specification, copyright Nov. 2000, 41 pages.
Notice of Allowance issued by United States Patent and Trademark Office for U.S. Appl. No. 14/839,491, dated Jul. 10, 2017, 9 pages.
Office Action issued by United States Patent and Trademark Office for U.S. Appl. No. 14/839,512, dated Nov. 15, 2017, 16 pages.
United States Patent and Trademark Office, Office Action dated Jan. 23, 2018 for U.S. Appl. No. 14/839,491, 22 Pages.
Office Action issued by United States Patent and Trademark Office for U.S. Appl. No. 14/714,161, dated Sep. 13, 2018, 13 pages.
United States Patent and Trademark Office, Office Action dated Nov. 27, 2018 for U.S. Appl. No. 14/839,491, 22 Pages.

* cited by examiner

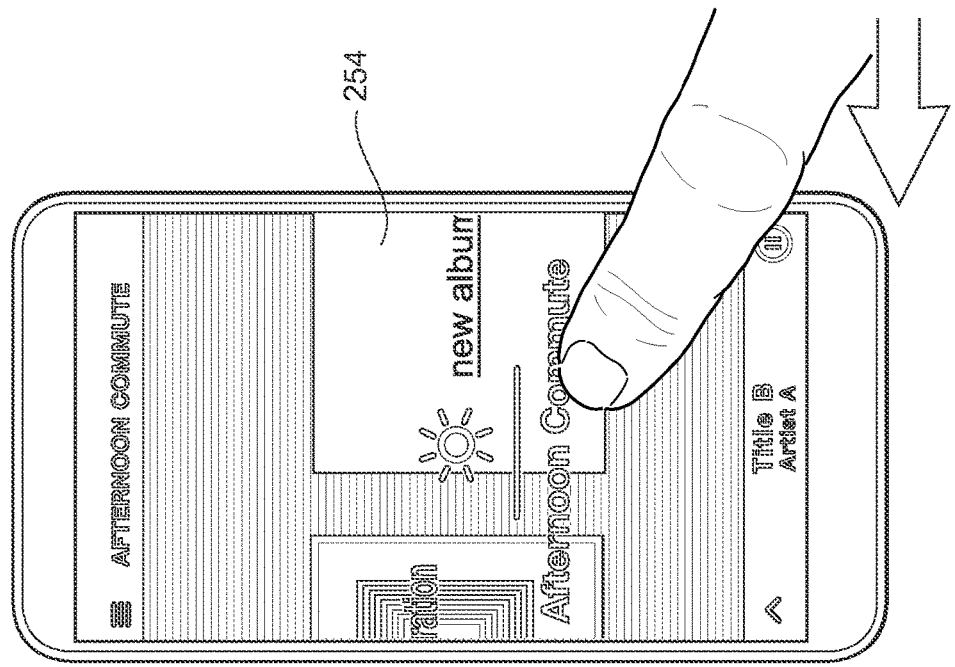
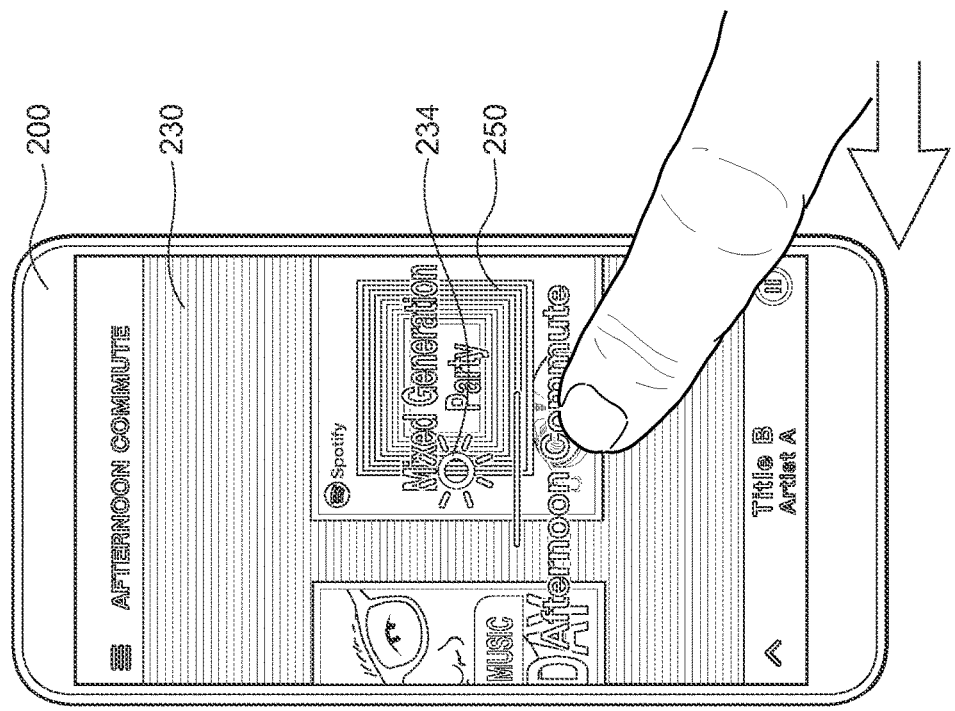

PLAYBACK OF MEDIA STREAMS IN DEPENDENCE OF A TIME OF A DAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of media, and more particularly to the streaming of media. In particular, the embodiments described herein relate to methods and electronic devices for performing playback of a media content stream and controlling a queue of subsequently playable media content items in dependence of a time of a day.

BACKGROUND

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than transmitting a complete file in physical media (such as CD or DVD, or downloading the entire file) before consuming the media content.

A user who uses an electronic device for performing playback of streamed media, requests media contents from a media server system. Typically, he/she inputs a title or an artist name at a user interface of the electronic device, and the electronic devices obtains the media content and performs playback of the media content at the user interface, e.g. by a speaker or display of the user interface.

SUMMARY

It is in view of the above considerations and others that the various embodiments disclosed herein have been made.

It is a general object of the embodiments described herein to allow for an improved way of controlling playback of media, such as music, in dependence of the time of the day.

This general object has been addressed by the appended independent claims. Advantageous embodiments are defined in the appended dependent claims.

In a first of its aspects, this disclosure concerns a method of controlling playback of streamed media content at a user interface of an electronic device in dependence of a time of a day. A portion of a day is determined. A first data message is sent to a computer server system, the first data message comprising instructions to the computer server system to return media content associated with the determined portion of the day. A second data message is received from the computer server system, the second data message comprising media content associated with the determined portion of the day. In response thereto is playback performed of the media content at the user interface of the electronic device in dependence of the determined portion of the day, and while performing playback, a visual appearance parameter of the user interface is adjusted according the determined portion of the day.

The aforementioned visual appearance parameter may be adjusted at a display of the user interface by: displaying a symbol representing the determined portion of the day; displaying a color representing the determined portion of the day; or by adjusting a brightness level representing the determined portion of the day.

Additionally, the second data message may comprises information related to the media content, and the method may further comprise displaying the received information related to the media content at a display of the user interface. In addition, the second data message may comprise image data of an image related to the media content, which is processed into the image before being displayed at the display, e.g. as a background image or partly at a pre-defined position of the display.

In some embodiments, the method may comprise receiving a request for changing media content items, wherein the request relates to changing media content items, from a currently playbacked first media content item of the media content to a second media content item of the media content. Furthermore, the method may comprise sending, to the computer server system, a request for the second media content item, receiving, from the computer server system, the second media content item, and performing playback of the second media content item at the user interface.

In a second of its aspects, this disclosure concerns an electronic device for performing playback of a streamed media content in dependence of a time of a day at a user interface of the electronic device The electronic device comprises a user interface; a processor; and a memory. The memory stores computer program code, which, when run in the processor causes the electronic device to determine a portion of a day, send a first data message to a computer server system, the first data message comprising instructions to the computer server system to return media content associated with the determined portion of the day. Furthermore, the processor causes the electronic devices to receive a second data message from the computer server system, the second data message comprising media content associated with the determined portion of the day, and in response thereto perform playback of the media content at the user interface of the electronic device, and while performing playback, adjusting a visual appearance parameter of the user interface according the determined portion of the day.

In some embodiments, the memory may store computer program code, which, when run in the processor causes the electronic device to adjust the visual appearance parameter by: displaying a symbol representing the determined portion of the day, or displaying a color representing the determined portion of the day.

In some embodiments, the memory may store computer program code, which, when run in the processor causes the electronic device to: receive a request for changing media content items, wherein the request relates to changing media content items, from a currently playbacked first media content item of the media content to a second media content item of the media content, send, to the computer server system, a request for the second media content item, receive, from the computer server system, the second media content item, and perform playback of the second media content item at the user interface.

As will be appreciated, the aforementioned media content stream may comprise an audio content stream, such as a song, or a video content such as a streamed video cast.

In some embodiments, the electronic device is a stationary electronic device, such as a stationary computer. In alternative embodiments, a portable electronic device, such as a portable media presentation device, a mobile telephone, a cellular telephone, a tablet computer, a laptop computer, or a personal digital assistant.

In a third of its aspects, this disclosure concerns a computer program, comprising instructions which, when executed on at least one processor, cause the at least one processor to carry out the method according to the earlier-described first aspect. A carrier comprising the computer program may also be provided. The carrier may for example be one of an electronic signal, an optical signal, a radio signal, or a computer readable storage medium.

Various embodiments described herein allow a user of an electronic device to automatically obtain media content which is associated with the current portion of the day. In some advantageous embodiments, the user is enabled to influence the playback when the user device performs playback. For instance, the user may be enabled to change media content item of day portion manually at the user interface. By providing the user's inputs to the media server, the media server may be enabled to analyze the user's personal routines. By taking this analysis into account, the media server may be enabled to improve appropriateness of the delivered media content for users.

BRIEF DESCRIPTION OF THE DRAWINGS

These and other aspects, features and advantages will be apparent and elucidated from the following description of various embodiments, reference being made to the accompanying drawings, in which:

FIGS. 6A-6C are schematic illustrations of scenarios at a user interface in accordance with an embodiment;

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for playback of streamed media content may be inadequate. It is therefore a general object of the embodiments described herein to allow for an improved playback of streamed media content.

To address this, in accordance with an embodiment, described herein are a method and an electronic device for performing playback of a media content stream in dependence of a portion of a day.

A user interface at an electronic device determines a current portion of a day, sends a request for media content items which are associated with a the portion of the day to a media server, receives and performs playback of the media content items.

Within this description, the term "Media content" will be used to denote any type of media suitable for being playbacked on a speaker or a display of a user interface. For instance, media content may be realized in form of audio content, video contents, or image contents. "Media content items", are items of these media content forms. For instance, a media content item may be a song, a video, an image. Furthermore, a media content item may comprise more than one form of media content, e.g. a music video comprises typically both a video part to be displayed at a user interface, and a corresponding audio part to be played at a speaker of the user interface. It is also understood that a media content comprises a sequence of media content items.

For instance an electronic device which receives streamed a media content, receives a number of media content items in a stream from a media server. A media content which is associated to a portion of a day is a sequence of media content items which are associated with that day portion.

Turning now to the figures, various exemplifying embodiments of the invention will be described in further detail.

Figure 1:
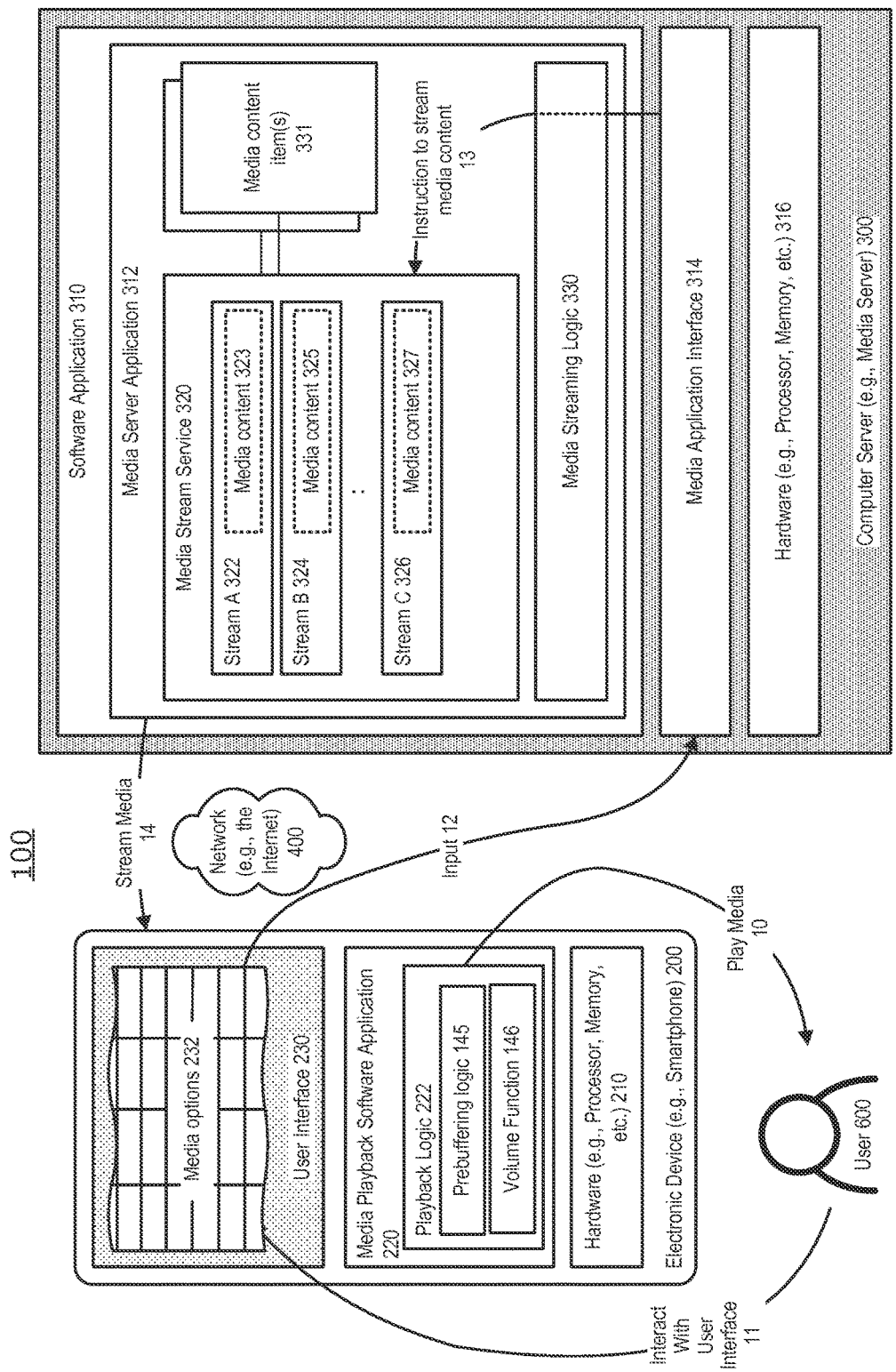
FIG. 1 is a block diagram schematically illustrating an exemplary media content delivery system in accordance with some embodiments.

FIG. 1 illustrates a system 100 for playback of media content, in accordance with an example embodiment. The system 100 may comprise an electronic device 200 and a computer system 300 operating as a media server. The electronic device 200 may be communicatively connectable to the computer system 300 via a network 400, such as the Internet, as is conventional and known in the existing art. As can be seen in FIG. 1, only a single electronic device 200 and a single computer system 300 are shown. However, the computer system 300 may support the simultaneous use of multiple electronic devices, and/or the electronic device 200 can simultaneously access video content at multiple computer systems.

In the following description, the media content will be exemplified to be audio content so as not to obscure the description of the embodiments disclosed herein with unnecessary detail. This should, however, not be interpreted as limiting the scope of the various embodiments of the invention.

As shown in FIG. 1, the electronic device 200 may be used for the playback of audio content in dependence of a time or portion of a day, wherein the audio content is provided by the computer system 300. The electronic device 200 may be a mobile telephone, such as a smart phone. Alternatively, the electronic device 200 may be a tablet computer. In yet other embodiments, the electronic device 200 may be any other electronic device capable of playback of audio content complemented with lyrics content, such as, for example, one of the electronic devices of the following group: a computer, a laptop computer, and a mobile electronic device (e.g. a handheld entertainment device, a digital media player, or other media device).

The electronic device 200 may include one or several physical computer resources, or hardware resources 210. Likewise, the computer system 300 operating as a media server may include one or several physical computer resources, or hardware resources 316.

The computer system 300 may include an operating system or other processing system which supports execution of a software application 310, including a media server application 312 which may be used, for example, to stream audio content associated with a portion of a day. A media stream service 320 may be used to buffer media contents 323, 325, 327, e.g. audio content, video content, image content, etc., of appropriate media content items 331, for streaming to one or more media streams 322, 324, 326. A media application interface 314 may receive requests from electronic devices 200 or other systems, to retrieve media contents associated to an appropriate portion of the day from the computer system 300.

Media content or items 331 may be provided, for example, within a database or repository, or may be received by the computer system 300 from another source (not shown). This another source (not shown) may be external to the computer system 300, i.e. it may be located remotely from the computer system 300.

A media streaming logic 330 may be used to retrieve or otherwise access the media content items 331 in response to requests from electronic devices 200 or other systems, and populate the complemented stream service with streams 322, 324, 326 of appropriate media content items 331 that may be returned to the requesting electronic device 200.

In some embodiments, the electronic device 200 comprises a user interface 230. Typically, the user interface 230 includes a display 232, which is adapted to display lyrics information and a speaker (not shown) which is adapted to play the audio content. The display 232 is preferably, though not necessarily, a touch-sensitive display that is adapted to detect or otherwise determine a user input.

Selecting lyrics to be displayed at the display 232 may be used, or otherwise interpreted, as a request or instruction to the media server application 312 to stream or otherwise return associated media content which is being playbacked. For example, in accordance with some embodiments, the software application 310 at the computer system 300 may be used to stream or otherwise communicate associated media content to the electronic device 200, wherein the display 232 of said user interface 230 at the electronic device 200 is adapted to display an image which is associated to a song when playing the audio content at the speaker of the electronic device 200.

A user 600 may interact 11 with the user interface 230 and issue requests, for example the playing an associated song (audio content) or displaying an associated lyrics on the electronic device 200. The user's manual selection of day portion may be communicated 12 to the media server application 312, via the media application interface 314. The media server application 312 may then be instructed 13 to stream associated media content, including one or more streams of media content items 331, and subsequently stream 14 or otherwise communicate to the user's electronic device 200. In accordance with some embodiments, pre-buffering requests from the electronic device 200 may also be communicated to the media server application 312 via the media application interface 314. At the electronic device 200, in response to the user's interaction with the user interface 230, the media playback application 220, including the playback logic 222, may playback 10 the requested media content to the user 600, for example by playing back a song on the electronic device 200, as described in further detail below.

FIG. 2A-2G illustrate seven example views of a user interface of an electronic device in accordance with one exemplifying embodiment.

In this embodiment, a day is divided in seven day portions: early morning, morning commuter, workday, afternoon commuter, evening, late evening and bed-time. Because a user of a streamed media may prefer different types of media dependent on the time of day and/or, the current on-going activity, or the user's mood, each portion of day may be adapted to an appropriate preferred type of media. For instance, in "early morning" the user may prefer soft harmonic music, when travelling to work or school, i.e. "morning commuter", the user may prefer morning news, e.g. a morning radio show, where music is mixed with news. During the workday the user may prefer music which gives energy and inspiration without disturbing the user, etc.

Figure 2A:
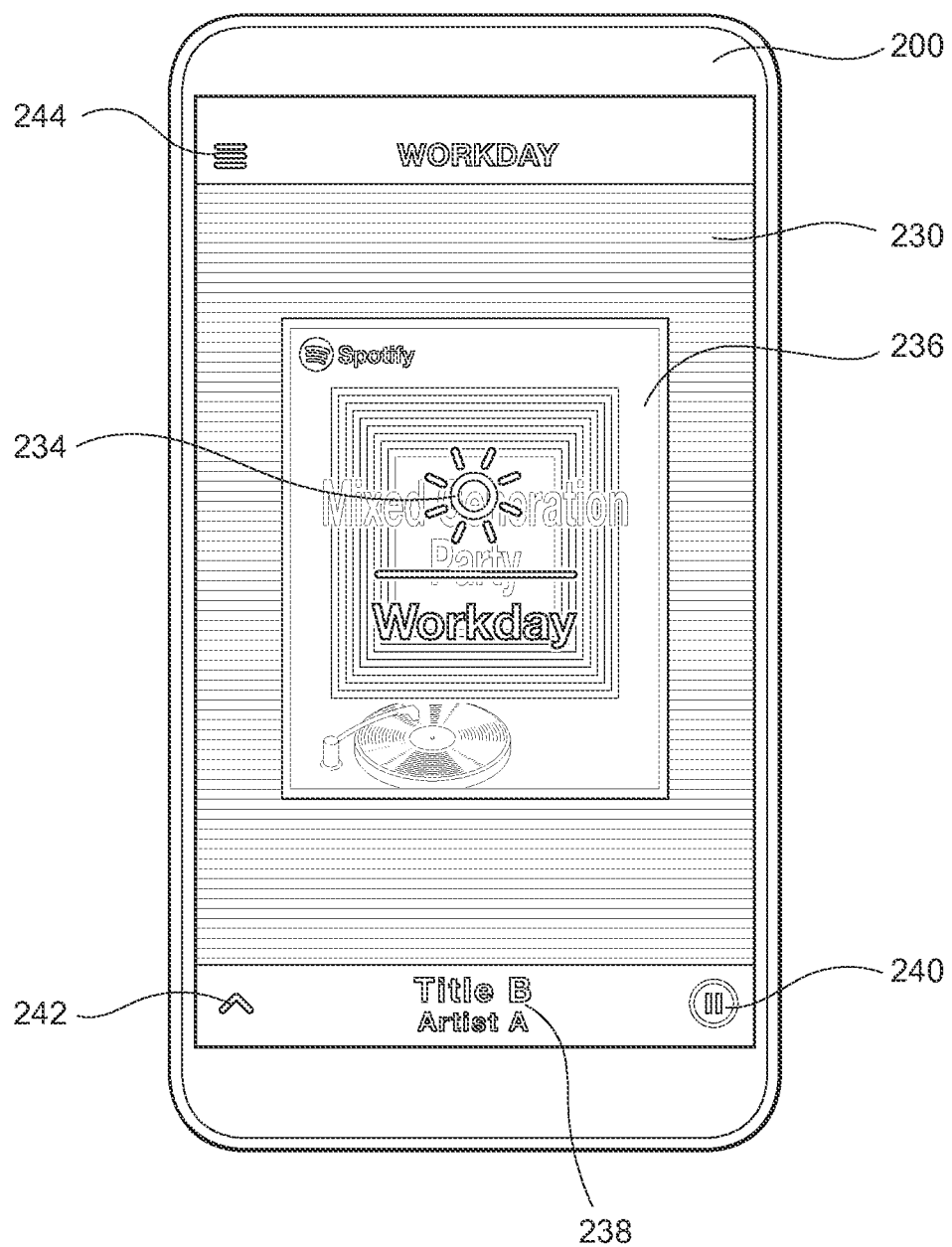
FIG. 2A-2G are schematic illustrations of a user interface in accordance with an embodiment.

FIG. 2A illustrates a schematic view of the portion of day "workday". In the figure the electronic device 200 and the user interface 230 which was described in conjunction with FIG. 1 are shown, and the same reference numbers are therefore applied. The user interface 230 comprises a display at which a color (illustrated as a texture of horizontal lines in the figure) and a symbol 234 associated with the current portion of the day are displayed. When the user listens to the audio content of the day portion, the electronic device 200 requests and receives media content from a computer server system, e.g. a centrally located media server and performs playback of the received media content at the user interface 230. In this embodiment the symbol 234 representing the workday is a sun and is complemented with a text "Workday" at the user interface 230.

However, it is to be noted that the disclosed user interface 230 is not limited to the above described design and may be implemented differently within the disclosed concept. For instance, the user interface 230 may comprise further information 236, 238 associated with the currently playbacked media content, e.g. artist, title, or an image such as an album cover. The user interface 230 may also comprise user control means 240, 242, 244 by which the user may control the playback or the user interface 230.

In a related exemplifying embodiment which is based on the embodiment described above, the user interface 230 comprises three user control means; a pause control 240, an expansion control 242, and a user settings control 244. By performing a user input, such as a tap gesture, a swipe gesture, or a press gesture, the user may force the electronic device to amend the performed playback or user interface 230. For instance, tapping of pressing the pause control 240 will pause the performed playback, while swiping the expansion control 242 will switch to an ordinary music player, and tapping or pressing the user settings control 244 will show a settings menu at which the user may input his/her preferred settings, e.g. changing symbols 234, colors, text font etc. However, the designer of the user interface is not limited to implement exactly these examples of user control means, instead he/she may select any suitable combination of appropriate user control means 240, 242, 244, or implementing further, alternative, or fewer user control means, when designing the user interface 230.

By determining the current portion of the day, requesting and receiving a stream of media content which is associated with this portion and adjusting a visual appearance parameter while performing playback, the electronic device is enabled to perform playback of a suitable media content at a simplified user interface in accordance with the portion of the day. Thus, the electronic device may automatically playback media content which is suitable for the current situation of the user, without need for user input. Thereby, the user may perceive that he/she is automatically served with an appropriate media content, which is convenient and increases user performance.

Figure 2B:
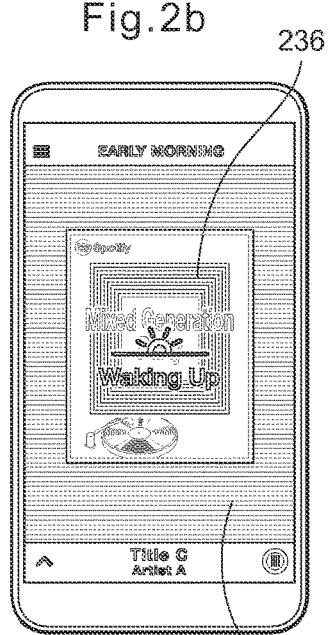

FIGS. 2B-2G illustrate further schematic views of respective portions of the day. FIG. 2B illustrates the portion "Early morning". As seen in the figure, the visual appearance parameter, i.e. the symbol 236, is changed into a raising sun, and the name of the portion in the upper bar is changed. In addition, another media content is playbacked, which is seen in the lower bar as another title and artist name.

Figure 2C:
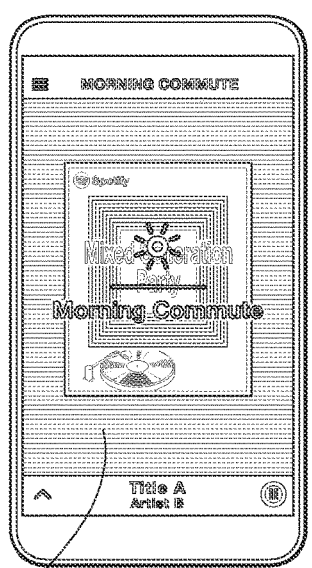
Figure 2D:
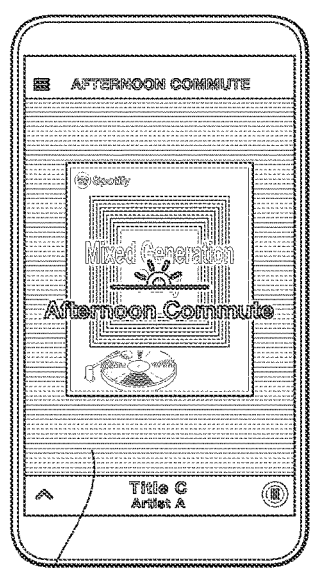
Figure 2E:
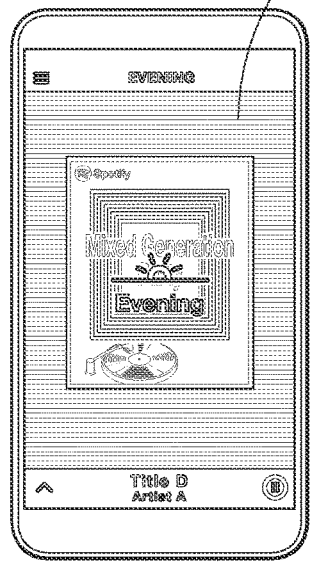
Figure 2F:
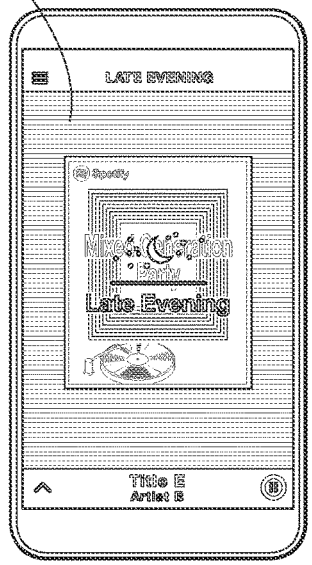
Figure 2G:
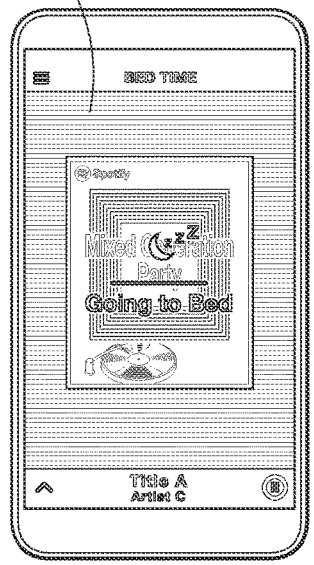

Correspondingly, FIG. 2C illustrate "Morning commute", FIG. 2D "Afternoon commute", FIG. 2E "Evening", FIG. 2F "Late evening", and FIG. 2G "Bed time".

As example of suitable media contents; Afternoon commute may comprise news, Evening may comprise appropriate music, Late evening may comprise a TV-show, and Bed time may comprise relaxing music for facilitating falling asleep. However, these listed types of media content are just mentioned as non-limiting examples, and the user interface may adapt the media content to the user, e.g. by analyzing the users' historical consumption of media content.

When performing the above described playback of media content at the user interface, the playback may be started by a user of the electronic device, or automatically by the user interface. Below, two alternative implementations of start of the playback will be described.

Figure 3A:
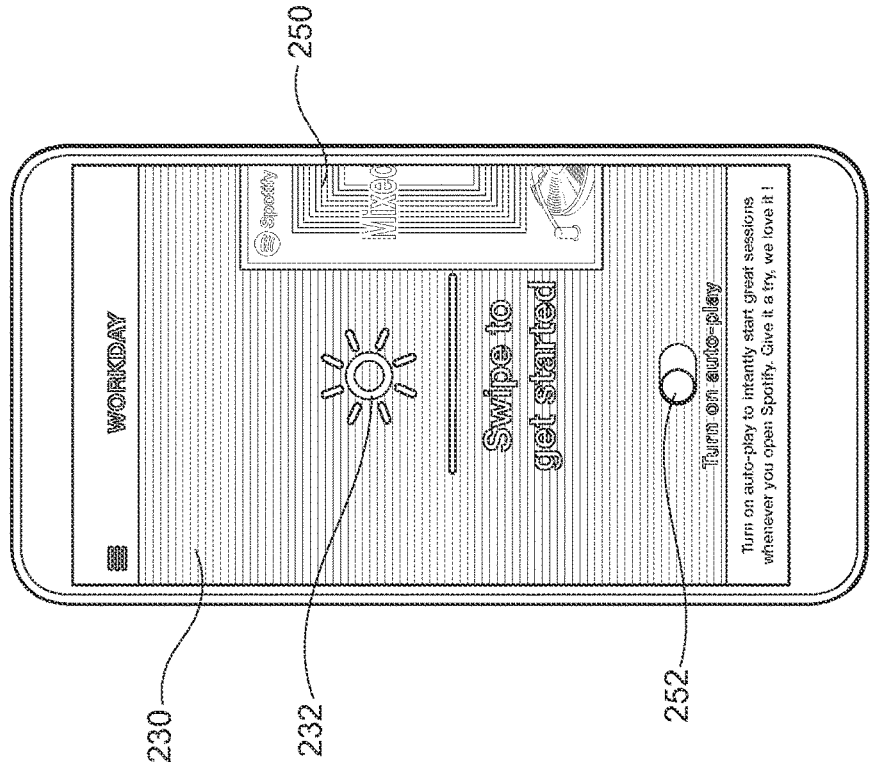
FIGS. 3A-3B are schematic illustrations of an alternative design of a user interface in accordance with an embodiment.
Figure 3B:
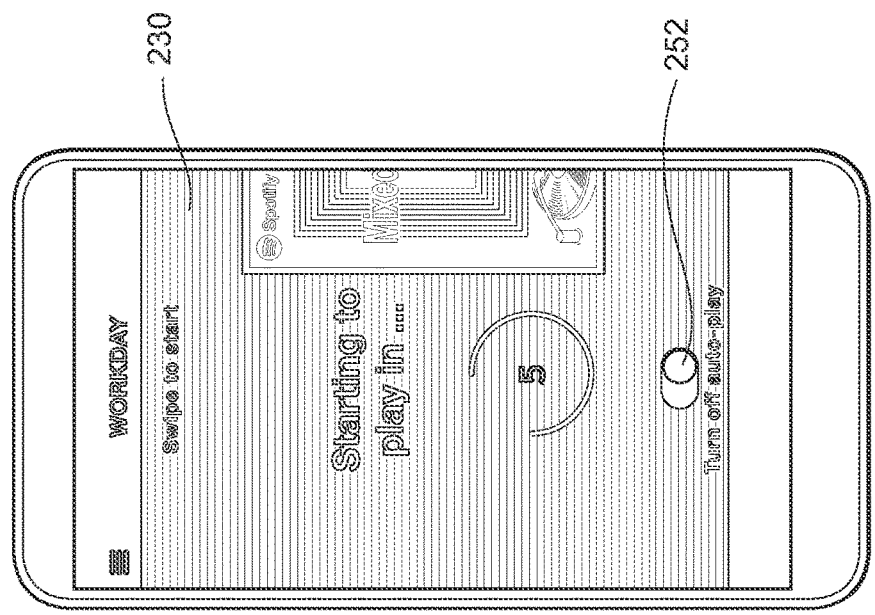

FIGS. 3A-3B illustrate two schematic views of a user interface of an electronic device in accordance with two exemplifying embodiments. The user interface 230 corresponds to the above described user interface and the same reference numbers are therefore utilized when appropriate.

In FIG. 3A, the user interface 230 automatically starts playback of media content, so called auto-play. In this embodiment, the electronic device 200 automatically starts the playback when the electronic device is on and a service for performing playback is requested. For instance, an application is installed in the electronic device, and the application performs the playback at the user interface 230. When the application starts the service, media content items are requested from a computer server system. During start-up of the service and request of media content, the user interface 230 displays a start view, as seen in the FIG. 3A.

The start view comprises a text "Starting in . . . " and a counter which counts down. In the FIG. 3A the counter is illustrated as the symbol "5". The start view may further comprise a time-scale, e.g. a time-scale which decreases. In the FIG. 3A, such an increasing time-scale is illustrated as a circle segment. By arranging a counter which counts down a time, or a time-scale which decreases, a user may perceive that the start-up process proceeds.

The user interface may also inform the user which media content item that will be playbacked by displaying an image 250 which is associated with the media content item to be played. By making the user aware of coming media content items, the user may perceive that his/her control of the playback increases, which may give rise to an increased user experience. However, information regarding media content items to be playbacked may be implemented alternatively too. For instance a text or an appropriate symbol which is associated with the coming media item may be displayed.

In the FIG. 3A is also an auto-play control 252 shown at the user interface 230. By swiping the user control to the left the user may switch off the auto-play mode.

In FIG. 3B, the user interface 230 instead starts the playback of the media content items in response to a user input, i.e. the user interface 230 awaits a manual user input at the user interface 230 before starting the playback. In FIG. 3B the symbol of the current portion of the day is displayed together with an instruction "Swipe to get started". At the display is further information 250 regarding the media content to be playbacked shown, corresponding to in the alternative embodiment above. By performing a user input in form of a horizontal swipe gesture, the user requests the electronic device to start requesting the media content item to be received and being playbacked at the user interface 230. When waiting for the manual user input, the electronic device 200 may perform a pre-caching of the initial part of the media content item to be playbacked. Typically, the electronic device may request and pre-cache some seconds of the media content item. When the user swipes horizontally at the user interface 230, e.g. at a touch-sensitive surface of the user interface 230, the user interface 230 will start the playback of the pre-cached portion and simultaneously request the rest of the media content. By storing a pre-cached portion of the media content, requesting and buffering the remaining part while performing playback of the pre-cached portion, the electronic device 200 will be enabled to start playback almost instantly and seamlessly perform with the buffering part. The user will perceive that the playback of the media content is instant and without interruptions, which increases the user experience.

As seen in the FIG. 3B, the user interface may further comprise the auto-play control 252 of the preceding embodiment, by which the user may switch on the auto-play mode.

Thus, the auto-play control 252 of the embodiments above enables the user to manually select whether or not to set the electronic device 200 in auto-play mode. As seen in FIG. 3B, the user interface 230 may comprise further information, e.g. an information text which describes the functionality of auto-play mode or other settings.

In some of the embodiments above the media content is audio content, e.g. songs, podcasts, etc. However, the concept is not limited to performing playback of audio content. Within the disclosed concept, other types of media content could also be playbacked at the user interface 230, e.g. video content. When performing playback of video content it is not suitable to arrange the symbol 234 (of FIG. 2A) at the same position of the user interface as the video content.

Figure 4A:
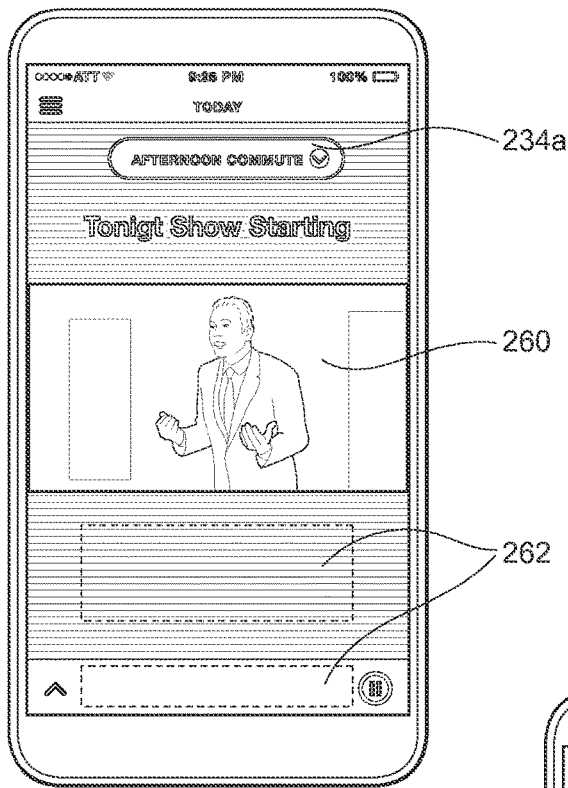
FIGS. 4A-4B are schematic illustrations of an alternative design of a user interface in accordance with an embodiment.
Figure 4B:
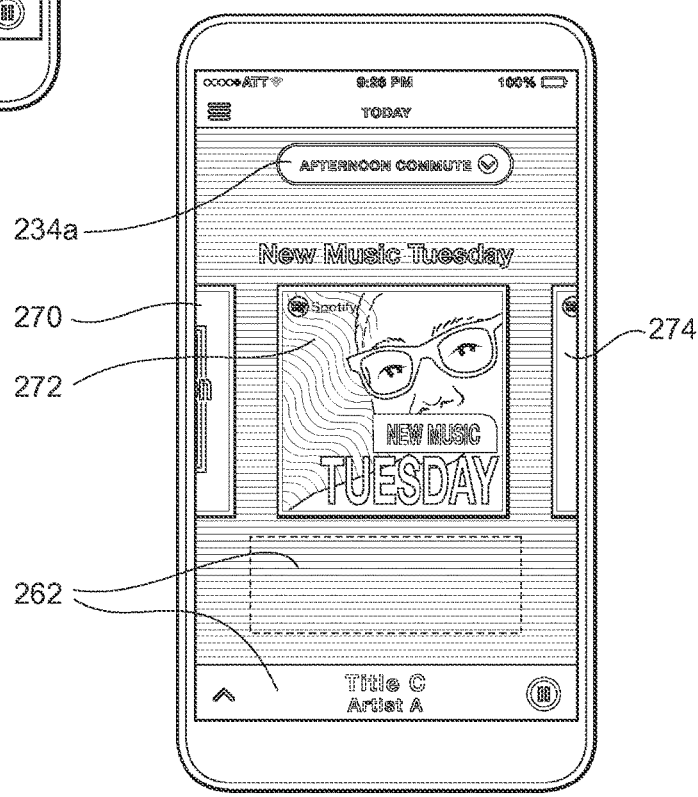

FIGS. 4A-4B illustrate two schematic views of a user interface of an electronic device in accordance with two exemplifying embodiments. The user interface 230 corresponds to the above described user interface and the same reference numbers are therefore utilized when appropriate.

In FIG. 4A, the electronic device displays a TV-show 260 at a position of a display of the user interface 230. In order to not disturb the displaying of the TV-show, the user interface does not display any symbol 234 corresponding to the symbol 234 of FIG. 2a. Instead an alterative information bar 234A is arranged above the TV-show. The information bar 234a may be provided with a user control means ("v" in the FIG. 4A) which when touched/pressed expands the information bar 234a and enables the user to switch portions of the day. Furthermore, the user interface may comprise further information fields 262. These further information fields may display additional information regarding the currently playbacked media content item and the media content item to be playbacked.

In FIG. 4B, the electronic device performs playback of a podcast, and displays images which are associated with the podcast and other media content items. In FIG. 4B, the last playbacked media content item is indicated to the left of the display as a part of an image 270, the currently playing media content item is shown as an image 272 or a video in the middle, and the media content item to be played is indicated to the right as a part of another image 274.

In both the above disclosed embodiments, the electronic device is shown with a portrait-oriented display of the user interface, without being limited thereto. Alternatively, the user interface may instead be adapted to display the TV-show 260 or images 270, 272, 274 when the electronic device is rotated and the display is landscape-oriented. The user interface 230 will then show the information bar 234a, and the information fields 262 at some suitable positions at the display of the user interface 230. By rotating the electronic device 200 to be landscape-oriented, a larger part of the display may be utilized for displaying, e.g. the TV-show, and still keeping the proportions.

Figure 5:
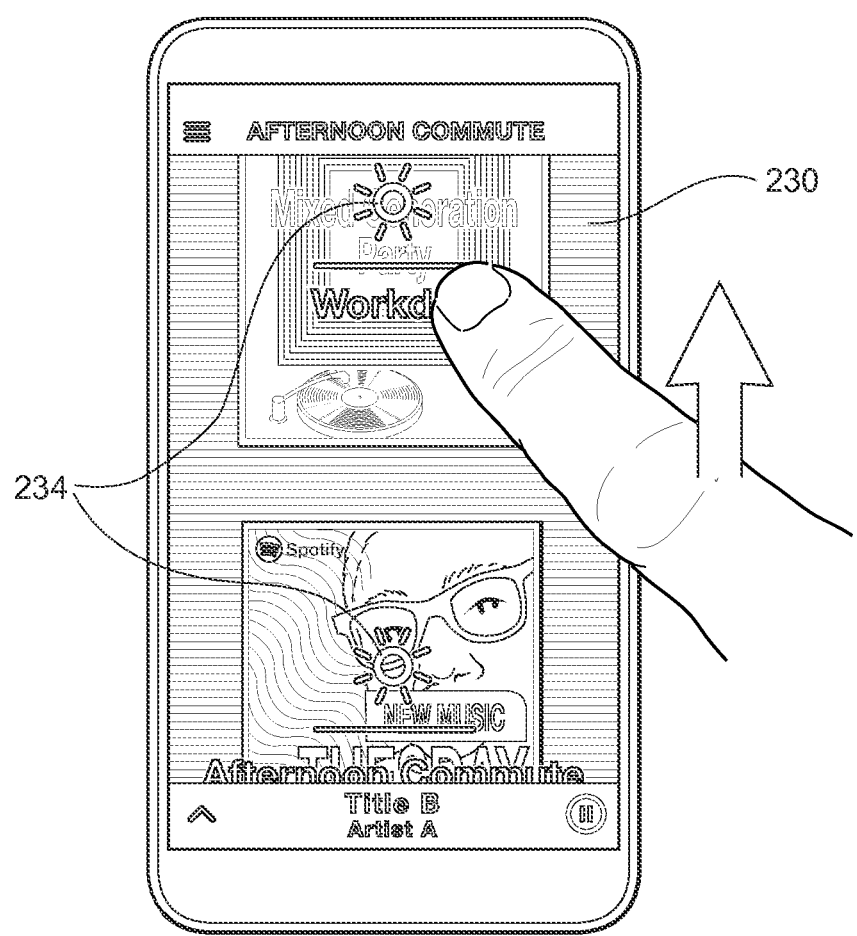
FIG. 5 is a schematic illustration of a scenario at a user interface in accordance with an embodiment.

FIG. 5 illustrates a schematic view of a user interface of an electronic device in accordance with one exemplifying embodiment. The user interface 230 corresponds to the above described user interface and the same reference numbers are therefore utilized when appropriate.

In FIG. 5, the user changes portions of a day manually. The user performs a swiping gesture vertically at the user interface 230 and changes thereby from "Workday" to "Afternoon commute", when leaving the workplace earlier one day. As indicated in the figure, the symbol 234 and text for Workday are swiped away upwards and the symbol 234 and text for Afternoon commute are instead swiped in to be displayed.

The electronic device may be adapted to learn the behavior and daily routines of users. Typically, an application for control of the playback is installed in the electronic device, and the application comprises a pre-set day portion time table, according to which the electronic device changes the portions of a day. However, different users have different daily routines, but by implementing functionality which enables the users to change portions of the day manually by performing a user input gesture, e.g. a vertical swipe, registering and analyzing the manual changes, the electronic device may learn the behavior of an individual user. Thereby, the electronic device may adapt the day portion time table to the individual user, and increase the appropriateness in automatic changes of portions of the day.

The users may also change day portions manually for other reasons. For instance, if the user is delayed when travelling to work, he/she will prevent the electronic device from changing from "Morning commute" to "Workday". When the user realizes that the electronic device automatically changes the day portions, he/she will perform another user input gesture to return to the current portion and postpone the change. For instance, a tapping gesture at the user interface may force the electronic device to change back to the previous portion of the day and postpone the change 10 minutes. In addition, this change may not be registered. Thereby, specific manual changes of day portions which depend on occasional situations, such as delayed public transportations, which will not be registered, could be prevented from affecting the day portion time table.

Figure 6C:
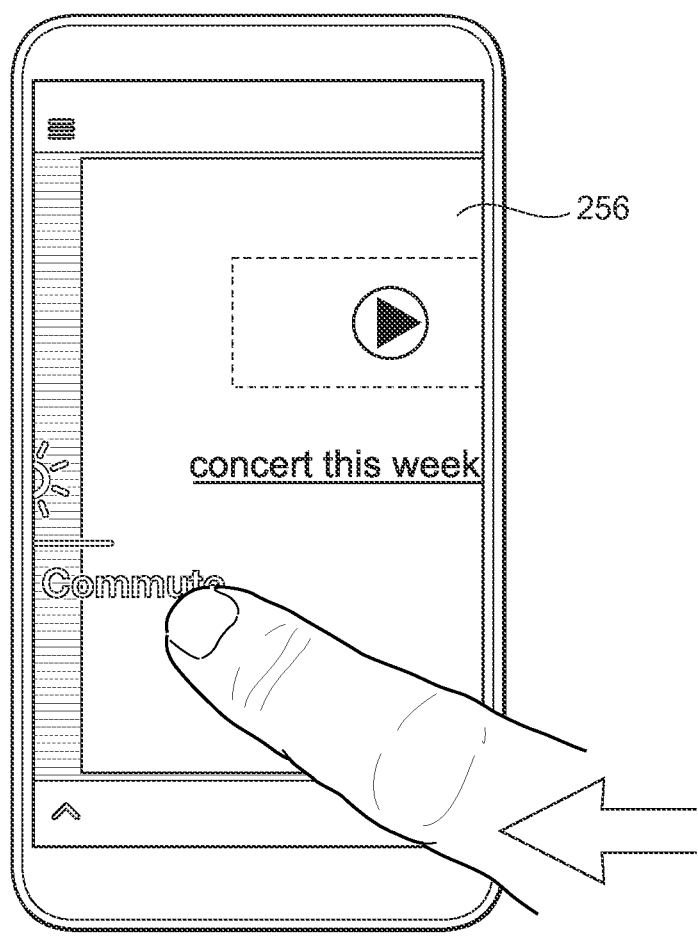

FIGS. 6A-6C illustrate schematic views of a user interface of an electronic device in accordance with some exemplifying embodiments. The user interface 230 corresponds to the above described user interface and the same reference numbers are therefore utilized when appropriate.

In the FIG. 6A, the electronic device 200 performs, at the user interface 230, playback of media content items and displays images 250 which are associated with the respective media content items. As seen is also the symbol 234 of the current day portion displayed at the user interface 230. The user requests a change of playbacked media content items by performing a swiping gesture at the user interface 230. In this embodiment the currently played media content item is a song, and the requested media content item is another song. The user interface 230 display obtains the requested media content item from a media server, which is part of a computer server system, by sending a request for the media content item and receiving the media content item in response thereto.

The user interface 230 changes the images 250, such that the image which is associated with the requested media content item is displayed, but keeps the symbol 230 at the display of the user interface 230. As described above, an initial part of the requested media content item could be pre-cached, such that the user perceives that the change of media content items is performed instantly.

In FIG. 6B, in an alternative embodiment, which is related to the above described one, the media content item which is changed differs in that the requested media content item comprises additional information 254, e.g. commercial information in form of an offer to users, or information regarding up-coming events, etc. For instance, this additional information 254 may relate to a new album or a concert. Furthermore, the media content item may comprise a hyperlink (exemplified as "new album" in FIG. 6B) to a service, such as a ticket reservation service, or fill-in forms in which the user may fill-in contact details, etc.

It is to be noted that the FIGS. 6A and 6B illustrates a non-limiting implementation of the user interface, and that the user interface may be alternatively designed within the disclosed concept. In FIG. 6C, in an alternative implementation of the user interface 230, the requested media content item comprises additional information 256 too, similar to in the embodiment described in conjunction with FIG. 6B. However, in this embodiment, the user interface 230 changes such as the requested additional information 256 instead is playbacked, i.e. is displayed, over a larger part of the display. Typically, the requested additional information 256 will overlap the current visual appearance of the user interface as illustrated. In addition, the overlapping information may have another visual appearance than the visual appearance of the user interface 230. In other words, the symbol and background color, etc. of the user interface are swiped away horizontally, such as the visual appearance of the information is shown instead. By assigning specific visual appearances for the additional information 256, the visual effect of the additional information 256 may be emphasized. The visual appearance of the additional information 256 may comprise an image, a video (illustrated as a dashed rectangle with a play symbol), a hyperlink (illustrated as "concert this week"), etc. which are displayed at the user interface.

In addition, an audio content item which is associated with the requested information may be further played at the user interface in order to emphasize the information further.

The user may then decide whether or not to take part of the additional information.

When taking part of the additional information, the user may click on links, fill in forms, etc. When instead deciding to not take part of the additional information, the user may instead swipe left to request another further media content item, or swipe right to return to the currently playbacked media content item.

Figure 7:
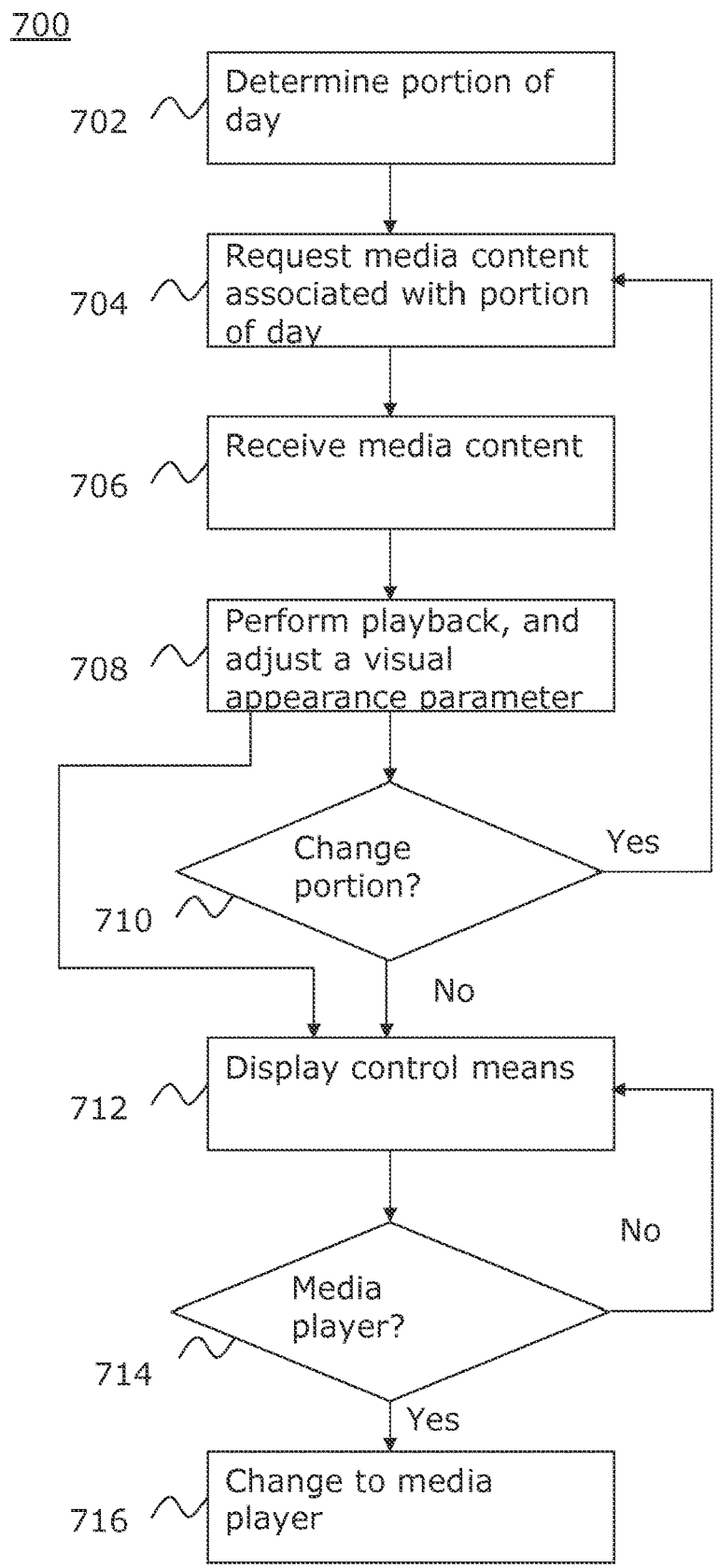
FIGS. 7-7A are schematic flow charts of methods in accordance with some embodiments.

FIG. 7 illustrates an example method 700 of operating an electronic device 200 for playback of media content according to embodiments herein. The method comprises determining 702 a portion of a day. In this embodiment, the day is divided in seven portions: "Early morning", "Morning commute", "Workday", "Afternoon commute", "Evening", "Late evening", and "Bed-time", where the portions relate to different activities of a user. As mentioned above in another exemplifying embodiment, these portions are just examples of possible day portions, and the described concept is not limited to these specific day portions and number of day portions. Typically, a designer may implement further or less day portions, and alternative portions, when appropriate. The electronic device may determine 702 the appropriate day portion by determining the current time and compare with a pre-stored day portion time table in the electronic device. Such a day portion time table may comprise time intervals corresponding to the respective day portions.

The method further comprises sending 704 a first data message to a computer server system. The first data message comprises instructions to the computer server system to return media content which is associated with the determined portion of the day. In other words the electronic device requests media content which is associated with the determined portion of the day. In response to the sent first data message, the electronic device receives 706 a second data message which comprises the requested media content from the electronic device. In this embodiment the second data message is comprised in a media stream which is sent from the computer server system.

The electronic device performs 708 then playback of the received media content at a user interface of the electronic device and adjusts a visual appearance parameter of the user interface according to the determined 702 portion of the day. For instance, when the media content is audio content, e.g. a song, the electronic device performs the playback by playing audio content at a speaker of the user interface and displaying a symbol representing the portion of the day at a display of the user interface. In this embodiment, the symbol is received within the media stream, without being limited thereto. Alternatively, a set of symbols may instead be stored in the electronic device, e.g. pre-stored. It is to be noted that even if the adjustment of the visual appearance parameter is performed by displaying a symbol, the implementation may be performed alternatively within the disclosed concept. Alternatively, a designer may instead design the electronic device to adjust a color or a brightness level at the display of the user interface according to the determined portion of the day, or any combination of symbol/color/brightness, etc.

By adjusting the visual appearance parameter at the display, a user of the electronic device interface will get improved control of which portion the day the currently playbacked media content is associated with, e.g. morning commute.

In the above described embodiment the day portion was determined automatically by consulting a day portion time table.

However, the users' routines may differ from one day to another.

In some embodiments, the method therefore further comprises determining 710 if the user manually changes portions of day. As illustrated in FIG. 5, the user performs a swipe gesture vertically to change the current portion of the day. If the user manually performs a change of portions of the day, i.e. updates the current portion of the day, the method repeats the actions 704-708 but for media content associated with the updated portion of the day.

Therefore, by implementing functionality for manual change of day portions, the user will be enabled to affect the performance of the playback to his/her current routines, which increases the flexibility to the user. For instance, if the public transportation to the user's workplace is delayed, the user may force the electronic device to change back to "morning commuter" from "workday" for a time period, when the electronic device automatically has changed from "morning commuter" to "workday".

In some embodiments, the method comprises to adaptively learn the user's personal routines, such that appropriateness in automatic changes between portions of the day increases. By increasing appropriateness in changes of portions of days, the users may perceive that his/her performance increases because the number of ill-matched changes of day portions will be decreased.

In some embodiments, the media content may comprise any of, or any combination of: audio content, video content, image content, etc. For instance, in the case that a song, which is an audio content, is comprised in the media content, image content could be received 706 from the computer server system. The second data message comprises then image data, which is processed by the electronic device into an image before being displayed at the user interface of the electronic device. For instance, if a user listens to a song, corresponding image content, such as the album cover, may be displayed simultaneously at a display of the user interface.

However the concept is not limited to the combination audio/image content. Within the disclosed concept, further combinations may be audio/video content, video/text content. For instance, the media content may comprise a podcast or a video cast and corresponding subtitles.

In some embodiments, the method further comprises displaying 712 a control means at the display of the user interface, and determining 714 whether a request for displaying a media player at the display is received. When a request, in form of a user input, is received for displaying a media player, the electronic device changes 716 to display the requested media player at the user interface instead of the displayed symbol representing the determined portion of the day. For instance, the requested media player is expanded over the symbol. In this embodiment, the user input is performed as a vertical swipe gesture at a touch-sensitive surface of the user interface, e.g. at the display. However, the user input is not limited to be a swipe gesture, and may alternatively be performed as any suitable user input, e.g. a tap gesture, a click gesture, or pressing a physical button at the user interface.

As indicated in the figure, the functionality of requesting 710 change of day portion and of enabling the user to change 716 to a traditional music player are not dependent on each other, and each one of these functionalities may be implemented separately, within the disclosed concept.

When performing playback of media content items in accordance with a specific portion of a day, the user may wish to change media content items from the currently playbacked. For instance, if the user listens to a song and observes that the next song to be played seems attractive, he may want to start playing this song immediately instead of waiting for an automatic change of songs. In another example, the user watches a show, and observes that there is a trailer available for another show or TV-program, he may then want to watch the trailer immediately.

Figure 7A:
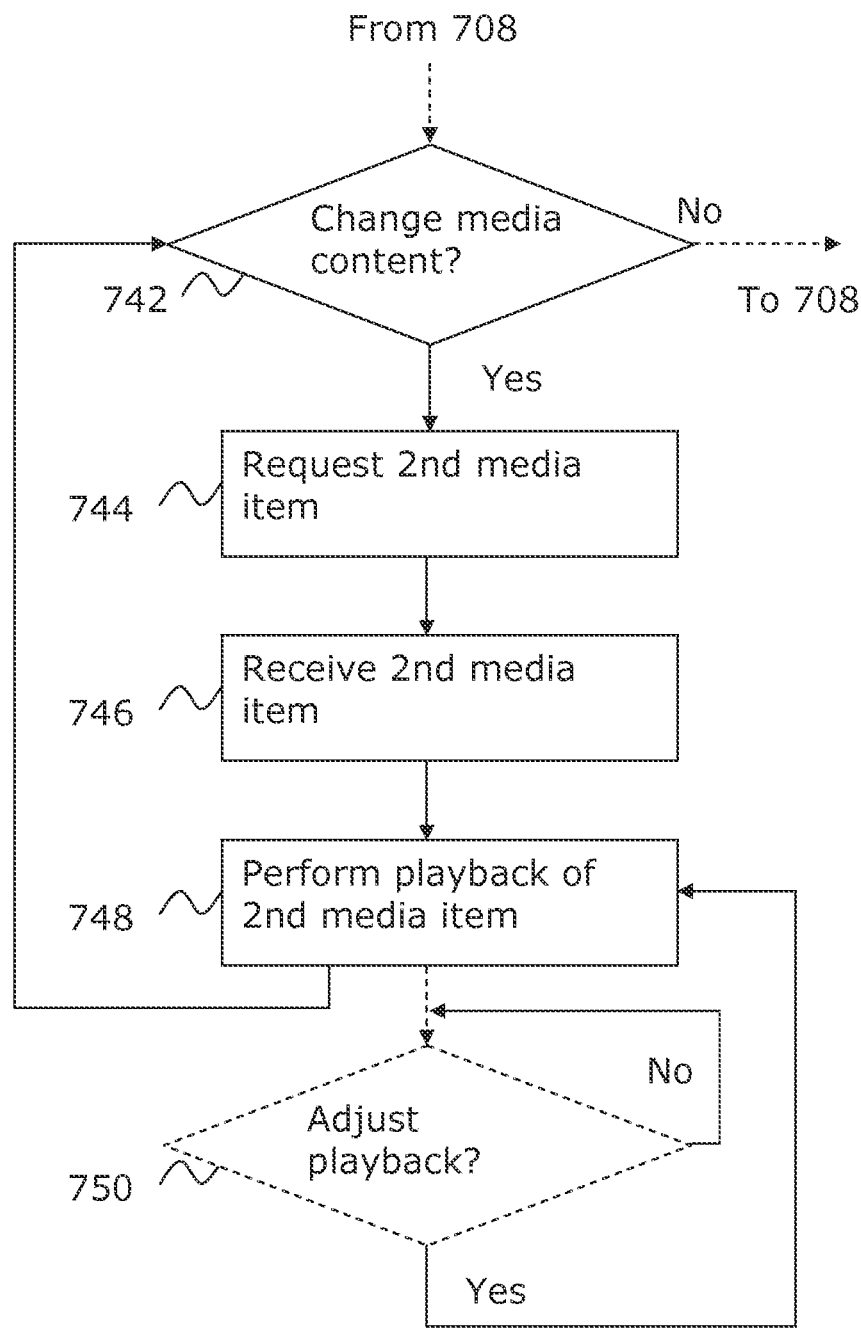

FIG. 7A illustrates an example method 740 of operating an electronic device 200 for playback of media content according to embodiments herein. The method 740 is based on some of the above described embodiments with conjunction to FIG. 7.

In an initial action 742, while playback of a first media content item is performed at the user interface of the electronic device, a request to change media content item to be playbacked is received. As stated above in another embodiment, the request may be performed as a horizontal swiping gesture at a touch-sensitive surface of the user interface, such as illustrated in any of the FIGS. 6A-6C.

The above described action 742, may be performed by continuously monitoring if a request to change media content item is received or not, and if no request is received proceeding perform playback according to action 708.

In response to receiving the request to change playbacked media content item, in a following action 744, a request for a second media content item according to the request is sent as a third data message to the media server, which is a part of a computer server system. The third data message comprises instructions to the media server to return the second media content item.

In a following action 746, the electronic device receives the second media content item streamed as a fourth data message.

In a subsequent action 748, the electronic device performs playback of the received second media content item, correspondingly as in the action 708, but for the second media content item instead of the first media content item.

As disclosed above in conjunction with the FIGS. 6B and 6C, the second media contents may be provided with additional information 254, 256, e.g. clickable hyperlinks of fill-in forms. In an optional action 750, the electronic device determines whether a request for adjusting the performed playback is received. Such a request may be a click gesture on a hyperlink of a textual input in a fill-in form, etc.

If the electronic device detects that a request for adjusting the performed playback was received, the electronic device adjusts the playback of the action 748 in accordance with instructions which are defined for the request. These instructions may be retrieved from the media server in further data messages.

However, it is to be noted that the method 740 is not limited to be based on any of the embodiments described in conjunction with FIG. 7, and that the principles of the method 740 alternatively may be utilized for any suitable playback of streamed media content performed at an electronic device when appropriate.

Example Computer-Readable Mediums

Figure 8:
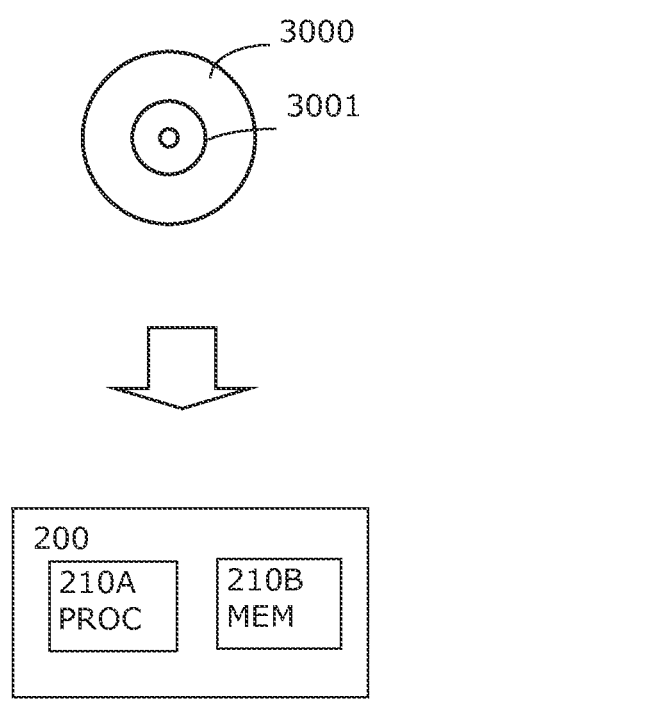
FIG. 8 is a schematic block diagram of a computer program product in accordance with one embodiment.

Turning now to FIG. 8, another embodiment will be briefly discussed. FIG. 8 shows an example of a computer-readable medium, in this example in the form of a data disc 3000. In one embodiment the data disc 3000 is a magnetic data storage disc. The data disc 3000 is configured to carry instructions 3001 that when loaded into a processor 210A of an electronic device 200, executes a method or procedure according to the embodiments disclosed in this disclosure. The data disc 3000 is arranged to be connected to or within and read by a reading device (not shown), for loading the instructions into the processor. One such example of a reading device in combination with one (or several) data disc(s) 3000 is a hard drive. It should be noted that the computer-readable medium can also be other mediums such as compact discs, digital video discs, flash memories or other memory technologies commonly used. In such an embodiment the data disc 3000 is one type of a tangible computer-readable medium. The instructions may alternatively be downloaded to a computer data reading device, such as a computer or other electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of controlling playback of streamed media content at a user interface of an electronic device in dependence of a time of a day, the method comprising:
   determining, by the electronic device, a current portion of a day, in accordance with a day portion time table comprising a plurality of time intervals corresponding to respective portions of the day,
   sending a first data message to a computer server system, the first data message comprising instructions to the computer server system to return a stream of media content items associated with the determined portion of the day,
   receiving a second data message from the computer server system, the second data message comprising the stream of media content items associated with the determined portion of the day, and in response thereto
   performing playback of the stream of media content items, at the user interface of the electronic device, in dependence of the determined portion of the day, and
   while performing playback and in response to receiving, at the user interface, a user input indicative of changing from the current portion of the day to an updated portion of the day,
   determining whether to register the change from the current portion of the day to the updated portion of the day, and
   in response to making the determination to register the change from the current portion of the day to the updated portion of the day, adapting the day portion time table such that at least one time interval of the plurality of time intervals corresponding to the current portion of the day or the updated portion of the day is modified based on the user input, wherein the adapted day portion time table is subsequently used in determining the portion of the day and controlling the playback of streamed media content in dependence of a time of day and the at least one modified time interval.

2. The method of claim 1, further comprising displaying a visual appearance parameter associated with the determined portion of the day, at the user interface, including performing, at a display of the user interface, at least one of:
   displaying a symbol representing the updated portion of the day, and
   displaying a color representing the updated portion of the day.

3. The method of claim 1, further comprising displaying a visual appearance parameter associated with the determined portion of the day, at the user interface, including adjusting a brightness level representing the current portion of the day.

4. The method of claim 1, wherein receiving the second data message comprises:
   receiving image data of images associated with the media content items; and
   receiving the media content items as audio content, and
   wherein performing playback of the media content items at the user interface comprises:
      playing the audio content by a speaker of the user interface,
      processing the received image data into the images, and
      displaying the images by a display of the user interface.

5. The method of claim 4, wherein displaying the images comprises displaying one or more of the images as at least one of:
   a background image, and
   a part of the image at a pre-defined position of the display.

6. The method of claim 1, wherein receiving the second data message comprises:
   receiving the media content items as video content and a corresponding audio content, and wherein performing playback of the media content items at the user interface comprises:
      displaying the video content by a display of the user interface, and
      playing the audio content by a speaker of the user interface.

7. The method of claim 1, further comprising, in response to receiving the user input indicative of changing from the current portion of the day to the updated portion of the day:
   sending a third data message to a computer server system, the third data message comprising instructions to the computer server system to return a stream of media content items associated with the updated portion of the day,
   receiving a fourth data message from the computer server system, the fourth data message comprising the stream of media content items associated with the updated portion of the day, and in response thereto
   performing playback of the stream of media content items associated with the updated portion of the day at the user interface of the electronic device, and while performing playback, adjusting a visual appearance parameter displayed at the user interface, according to the updated portion of the day.

8. The method of claim 7, wherein receiving the user input indicative of changing from the current portion of the day to the updated portion of the day comprises detecting a user gesture received at the user interface.

9. The method of claim 8, wherein the user interface comprises a touch-sensitive surface, and the user gesture comprises at least one of a swipe gesture, a tap gesture, a press gesture, and a click gesture.

10. The method of claim 1, wherein determining the current portion of the day comprises determining a time, comparing the determined time with the day portion time table comprising the plurality of time intervals corresponding to respective portions of the day, and determining, as the current portion of the day, the portion of the day for the time interval which comprises the determined time.

11. The method of claim 1, further comprising:
displaying a playback control at a display of the user interface, wherein the playback control comprises an expansion control,
receiving a request for displaying a media player at the display, and
displaying the media player at the display.

12. The method of claim 11, wherein receiving the request for displaying the media player comprises detecting a user input at the playback control.

13. The method of claim 12, wherein the playback control comprises a touch sensitive surface, and wherein detecting the user input comprises detecting the user input as at least one of a swipe gesture, a tap gesture, a press gesture, and a click gesture.

14. The method of claim 1, further comprising:
receiving a request for changing media content items, wherein the request relates to changing media content items, from a currently playbacked first media content item of the media content items associated with the determined current portion of the day, to a second media content item of the media content items,
sending, to the computer server system, a request for the second media content item,
receiving, from the computer server system, the second media content item, and
performing playback of the second media content item at the user interface.

15. The method of claim 14, wherein receiving the request for changing media content items comprises detecting a user input at the user interface.

16. The method of claim 14, further comprising, while performing playback of the second media content item at the user interface:
receiving a request for adjusting the performed playback of the second media content item at the user interface, and
adjusting the performed playback in accordance with the received request.

17. The method of claim 16, wherein performing playback of the second media content item comprises displaying an image content or a video content at the user interface, and receiving the request for adjusting the performed playback of the second media content item comprises detecting a user input comprising at least one of a tap gesture, a press gesture, or a click gesture, on the image content or the video content.

18. The method of claim 1, wherein performing playback of a media content item within the stream of media content items comprises starting playback of a pre-cached portion of the media content item, and requesting and buffering a remaining portion of the media content item while performing playback of the pre-cached portion.

19. An electronic device for playback of a streamed media content in dependence of a time of a day, the electronic device comprising:
a user interface;
a processor; and
a memory storing computer program code, which, when run in the processor causes the electronic device to:
determine a current portion of a day, in accordance with a day portion time table comprising a plurality of time intervals corresponding to respective portions of the day,
send a first data message to a computer server system, the first data message comprising instructions to the computer server system to return a stream of media content items associated with the determined portion of the day,
receive a second data message from the computer server system, the second data message comprising the stream of media content items associated with the determined portion of the day, and in response thereto
perform playback of the media content items, at the user interface of the electronic device, in dependence of the determined portion of the day, and
while performing playback and in response to receiving, at the user interface, a user input indicative of changing from the current portion of the day to an updated portion of the day,
determining whether to register the change from the current portion of the day to the updated portion of the day, and
in response to making the determination to register the change from the current portion of the day to the updated portion of the day, adapting the day portion time table such that at least one time interval of the plurality of time intervals corresponding to the current portion of the day or the updated portion of the day is modified based on the user input, wherein the adapted day portion time table is subsequently used in determining the portion of the day and controlling the playback of streamed media content in dependence of a time of day and the at least one modified time interval.

20. The electronic device of claim 19, wherein the memory stores computer program code, which, when run in the processor causes the electronic device to display a visual appearance parameter associated with the determined portion of the day, at the user interface, by performing at least one of:
displaying a symbol representing the determined portion of the day, and
displaying a color representing the determined portion of the day.

21. The electronic device of claim 19, wherein the memory stores computer program code, which, when run in the processor causes the electronic device to display a visual appearance parameter associated with the determined portion of the day, at the user interface, by adjusting a brightness level representing the determined portion of the day.

22. The electronic device of claim 19, wherein the user interface comprises a speaker and a display, and wherein the memory stores computer program code, which, when run in the processor causes the electronic device to:
receive the second data message by receiving image data of images associated with the media content items, and receiving the media content items as audio content,
process the received image data into the images, and
perform playback of the media content items by playing the audio content at the speaker, and displaying the images at the display.

23. The electronic device of claim 22, wherein the memory stores computer program code, which, when run in the processor causes the electronic device to display one or more of the images as at least one of:
a background image, and a part of the image at a predefined position at the display.

24. The electronic device of claim 19, wherein the user interface comprises a speaker and a display, and wherein the memory stores computer program code, which, when run in the processor causes the electronic device to:
receive the second data message by receiving the media content items as video content and a corresponding audio content, and
perform playback of the media content items at the user interface by displaying the video content by a display of the user interface, and playing the audio content by a speaker of the user interface.

25. The electronic device of claim 19, wherein the memory stores computer program code, which, when run in the processor causes the electronic device to, in response to the user input indicative of changing from the current portion of the day to the updated portion of the day,
send a third data message to a computer server system, the third data message comprising instructions to the computer server system to return a stream of media content items associated with the updated portion of the day,
receive a fourth data message from the computer server system, the fourth data message comprising the stream of media content items associated with the updated portion of the day, and in response thereto
perform playback of the stream of media content items associated with the updated portion of the day, at the user interface according to the updated portion of the day.

26. The electronic device of claim 25, wherein the memory stores computer program code, which, when run in the processor causes the electronic device to receive the user input indicative of changing from the current portion of the day to the updated portion of the day by detecting a user gesture received at the user interface.

27. The electronic device of claim 26, wherein the user interface comprises a touch-sensitive surface, and wherein the memory stores computer program code, which, when run in the processor causes the electronic device to detect the user gesture as at least one of a swipe gesture, a tap gesture, a press gesture, and a click gesture.

28. The electronic device of claim 19, wherein the memory stores computer program code, which, when run in the processor causes the electronic device to determine the current portion of the day by:
determining a time,
comparing the determined time with the day portion time table comprising the plurality of time intervals corresponding to respective portions of the day, and
determining, as the current portion of the day, the portion of the day for the time interval which comprises the determined time.

29. The electronic device of claim 19, wherein the user interface comprises a display, and wherein the memory stores computer program code, which, when run in the processor causes the electronic device to:
display a playback control at the display, wherein the playback control comprises an expansion control,
receive a request for displaying a media player at the display, and
display the media player at the display.

30. The electronic device of claim 29, wherein the memory stores computer program code, which, when run in the processor causes the electronic device to receive the request for displaying the media player by detecting a user input at the playback control.

31. The electronic device of claim 30, wherein the playback control comprises a touch sensitive surface, and wherein the memory stores computer program code, which, when run in the processor causes the electronic device to detect the user input as at least one of a swipe gesture, a tap gesture, a press gesture, and a click gesture.

32. The electronic device of claim 19, wherein the memory stores computer program code, which, when run in the processor causes the electronic device to:
receive a request for changing media content items, wherein the request relates to changing media content items, from a currently playbacked first media content item of the media content items associated with the determined current portion of the day, to a second media content item of the media content items,
send, to the computer server system, a request for the second media content item,
receive, from the computer server system, the second media content item, and
perform playback of the second media content item at the user interface.

33. The electronic device of claim 32, wherein the memory stores computer program code, which, when run in the processor causes the electronic device to receive the request for changing media content items by detecting a user input at the user interface.

34. The electronic device of claim 32, wherein the memory stores computer program code, which, when run in the processor causes the electronic device to, while performing playback of the second media content item at the user interface:
receive a request for adjusting the performed playback of the second media content item at the user interface, and
adjust the performed playback in accordance with the received request.

35. The electronic device of claim 34, wherein the memory stores computer program code, which, when run in the processor causes the electronic device to:
perform playback of the second media content item by displaying an image content or a video content at the user interface, and
receive the request for adjusting the performed playback of the second media content item by detecting a user input in form of a tap gesture, a press gesture, or a click gesture on the image content or the video content.

36. The electronic device of claim 19, wherein performing playback of a media content item within the stream of media content items comprises starting playback of a pre-cached portion of the media content item, and requesting and buffering a remaining portion of the media content item while performing playback of the pre-cached portion.

37. A computer program product comprising a non-transitory computer readable storage medium, having thereon a computer program comprising program instructions, the computer program being loadable into a data-processing unit and adapted to cause execution of the method comprising:
determining a current portion of a day, in accordance with a day portion time table comprising a plurality of time intervals corresponding to respective portions of the day,
sending a first data message to a computer server system, the first data message comprising instructions to the computer server system to return a stream of media content items associated with the determined portion of the day, receiving a second data message from the computer server system, the second data message comprising the stream of media content items associated with the determined portion of the day, and in response thereto performing playback of the media content items, at the user interface of the electronic device, in dependence of the determined portion of the day, and while performing playback and in response to receiving, at the user interface, a user input indicative of changing from the current portion of the day to an updated portion of the day, determining whether to register the change from the current portion of the day to the updated portion of the day, and in response to making the determination to register the change from the current portion of the day to the updated portion of the day, adapting the day portion time table such that at least one time interval of the plurality of time intervals corresponding to the current portion of the day or the updated portion of the day is modified based on the user input, wherein the adapted day portion time table is subsequently used in determining the portion of the day and controlling the playback of streamed media content in dependence of a time of day and the at least one modified time interval.

* * * * *